(12) United States Patent
Haile et al.

(10) Patent No.: US 6,497,950 B1
(45) Date of Patent: Dec. 24, 2002

(54) POLYESTERS HAVING A CONTROLLED MELTING POINT AND FIBERS FORMED THEREFROM

(75) Inventors: William A. Haile, Kingsport, TN (US); Leron R. Dean, Kingsport, TN (US); Richard L. McConnell, Kingsport, TN (US); Kishan C. Khemani, Santa Barbara, CA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/633,186

(22) Filed: Aug. 4, 2000

Related U.S. Application Data

(60) Provisional application No. 60/147,336, filed on Aug. 6, 1999.

(51) Int. Cl.$^7$ .............................. D02G 3/00; C08G 63/00
(52) U.S. Cl. ...................... 428/364; 528/298; 528/299; 528/300; 528/302; 528/307; 528/308; 528/308.6; 528/279; 428/373; 428/374
(58) Field of Search ................................ 528/279, 298, 528/299, 300, 302, 307, 308, 308.6; 428/364, 373, 374

(56) References Cited

U.S. PATENT DOCUMENTS

| | | | |
|---|---|---|---|
| 2,901,466 A | 8/1959 | Kibler et al. | 260/75 |
| 3,589,956 A | 6/1971 | Kranz et al. | 156/62.4 |
| 3,907,754 A | 9/1975 | Tershansy et al. | 260/75 |
| 3,962,189 A | 6/1976 | Russin et al. | 260/75 |
| 4,010,145 A | 3/1977 | Russin et al. | 260/75 |
| 4,217,426 A | 8/1980 | McConnell et al. | 525/173 |
| 4,356,299 A | 10/1982 | Cholod et al. | 528/279 |
| 4,419,507 A | 12/1983 | Sublett | 528/302 |
| 4,521,556 A | 6/1985 | Adams | 524/88 |
| 4,740,581 A | 4/1988 | Pruett et al. | 528/289 |
| 4,749,772 A | 6/1988 | Weaver et al. | 528/288 |
| 4,749,773 A | 6/1988 | Weaver et al. | 528/288 |
| 4,749,774 A | 6/1988 | Weaver et al. | 528/288 |
| 4,950,732 A | 8/1990 | Weaver et al. | 528/288 |
| 5,017,680 A | 5/1991 | Sublett | 528/274 |
| 5,106,944 A | 4/1992 | Sublett | 528/279 |
| 5,252,699 A | 10/1993 | Chamberlin et al. | 528/289 |
| 5,292,783 A * | 3/1994 | Buchanan et al. | 524/37 |
| 5,340,910 A | 8/1994 | Chamberlin et al. | 528/289 |
| 5,372,864 A | 12/1994 | Weaver et al. | 428/36.92 |
| 5,384,377 A | 1/1995 | Weaver et al. | 525/437 |
| 5,446,079 A | 8/1995 | Buchanan et al. | |
| 5,580,911 A | 12/1996 | Buchanan et al. | |
| 5,599,858 A | 2/1997 | Buchanan et al. | |
| 5,608,031 A | 3/1997 | Yau et al. | 528/281 |
| 5,643,991 A | 7/1997 | Stipe et al. | 524/496 |
| 5,668,243 A | 9/1997 | Yau et al. | 528/280 |
| 5,681,918 A | 10/1997 | Adams et al. | 528/279 |
| 5,773,554 A | 6/1998 | Dickerson et al. | 528/271 |

FOREIGN PATENT DOCUMENTS

| | | |
|---|---|---|
| DE | 28 47 533 | 5/1980 |
| EP | 0 036 062 | 9/1981 |
| FR | 2 138 728 | 1/1973 |
| FR | 2 279 784 | 2/1976 |
| GB | 2 089 824 | 6/1982 |
| JP | 51-148793 | 12/1976 |
| JP | 53-147815 | 12/1978 |
| JP | 57-101018 | 6/1982 |
| JP | 57-133217 | 8/1982 |
| JP | 58-8121 | 1/1983 |
| JP | 59-1715 | 1/1984 |
| JP | 63-112723 | 5/1988 |
| JP | 63-175119 | 7/1988 |
| JP | 63-182414 | 7/1988 |
| JP | 63-270812 | 11/1988 |
| JP | 3-180530 | 8/1991 |
| JP | 5-132548 | 5/1993 |
| JP | 6-2217 | 1/1994 |
| JP | 11032596 | 2/1999 |
| WO | WO 92/09654 | 6/1992 |
| WO | WO 96/15173 | 5/1996 |
| WO | WO 96/15174 | 5/1996 |
| WO | WO 96/15175 | 5/1996 |
| WO | WO 96/15176 | 5/1996 |
| WO | WO 96/25448 | 8/1996 |
| WO | WO 96/25466 | 8/1996 |
| WO | WO 00/12792 | 3/2000 |

OTHER PUBLICATIONS

Negi, Yuvraj S.et al., "Structure–Property Relationship in Copolyesters. I. Preparation and Characterization of Ethylene Trephathalate–Hexamethylene Terephthalate Copolymers," Journal of Applied Polymer Science, 28, pp. 2291–2302 (1983).

* cited by examiner

*Primary Examiner*—Samuel A. Acquah
(74) *Attorney, Agent, or Firm*—Bernard J. Graves; B. J. Boshears

(57) ABSTRACT

The invention relates to fibers, particularly binder fibers, made from polyesters and the polyesters themselves. The polyesters are the product of a reaction between a glycol component and a dicarboxylic acid component where the glycol component contains at least 50 mole % of a four carbon diol, such as 1,4-butanediol, or a six carbon diol, such as 1,6-hexanediol or a mixture of a four carbon and six carbon diol. Typically, the polyesters of the invention are semicrystalline and/or crystalline and have a specific melting point ranging from about 140 to about 185° C. The polyesters of the invention may be formed into a variety of products, especially binder fibers for nonwoven fabrics, textile/industrial yarns and fabrics, composites and other molded articles.

25 Claims, No Drawings

POLYESTERS HAVING A CONTROLLED MELTING POINT AND FIBERS FORMED THEREFROM

PRIORITY DATA

This application claims benefit under 35 U.S.C. §120 of provisional application Serial No. 60/147,336, filed Aug. 6, 1999, the disclosure of which is incorporated herein by reference in its entirety.

FIELD OF THE INVENTION

The invention relates to fibers, particularly binder fibers, made from polyesters and the polyesters themselves. The polyesters are the product of a reaction between a glycol component and a dicarboxylic acid component where the glycol component contains at least 50 mole % of a four carbon diol, such as 1,4-butanediol, or a six carbon diol, such as 1,6-hexanediol or a mixture of a four carbon and six carbon diol. Typically, the polyesters of the invention are semicrystalline and/or crystalline and have a specific melting point ranging from about 140 to about 185° C. The polyesters of the invention may be formed into a variety of products, especially binder fibers for nonwoven fabrics, textile/industrial yarns and fabrics, composites and other molded articles.

BACKGROUND OF THE INVENTION

It is well known that copolyesters can be prepared using processes involving polyesterification and polycondensation. Generally, as described in U.S. Pat. Nos. 2,901,466, 5,017,680, 5,106,944 and 5,668,243, the reactants include glycol components and dicarboxylic acid components. Typically, one dicarboxylic acid component is terephthalic acid and one dihydric alcohol is ethylene glycol. Such copolyesters are relatively inert, hydrophobic materials which are suitable for a wide variety of uses, including, molded articles, such as those used in the automobile and appliance industries, food trays, fibers, sheeting, films and containers, such as bottles. Unmodified poly(ethylene terephthalate) (PET) is very high melting (Tm=255° C.) and is therefore unsuitable for use in bonding nonwoven fiber and film laminates for use in the automotive industry.

Nonwoven fabrics are widely used in a variety of products. For example, nonwoven fabrics are suitable for use in automotive applications, composites, filters, roofing materials, backing materials, linings, insulation, face masks, medical/surgical, bedding, tablecloths, napkins, hygiene and absorbent products. High loft nonwoven battings are also used in a number of products, including comforters, robe wear, and bra cups. Generally, nonwoven fabrics are based on polyester, acrylic, nylon, carbon, glass and cellulosic fibers which may be bonded with latex adhesives, binder fibers, or polymers in powder form. The bonding of nonwoven fabrics with binder fibers provides a convenient method for making nonwoven fabrics without the need for water-based adhesives which are less environmentally friendly. Nonwoven fabrics bonded with binder fibers are economical to produce, and provide a method for making articles, which are unique or superior in performance. Other applications are uses in yarns to increase strength and reduce pilling or linting, as well as in prepregs, preforms and a wide range of composite structures.

Certain copolyesters have been found to be useful as binder fibers. For example, polyethylene terephthalate (PET) copolyesters containing 1,4-cyclohexanedimethanol having inherent viscosity (I.V.) values in the range of about 0.6 to about 0.8 have been used in the past as binder fibers to bond polyester or other fibers. However, many of these polymers are amorphous or only slightly crystalline. Fibers made from these polymers are not fully suitable for automotive applications such as headliners which can be exposed to elevated temperatures in closed cars parked in hot climates.

Generally, as described in U.S. Pat. Nos. 4,217,426 and 4,419,507, linear, crystalline or partially crystalline polymers have been reported as useful for forming fusible interlining adhesives and in some instances as binder fibers. Indeed, binder fibers and powders made from poly (hexamethylene terephthalate) copolyesters (PHT) have been sold. Such powders and binder fibers include Eastobond FA 300 which was formed from a copolyester having 20 mole % 1,4-butanediol and had a melting point of about 125° C. as well as Eastobond FA 250 which contained 20 mole % isophthalic acid and 20 mole % 1,4-butanediol and had a melting point of about 104° C.

While previous polyesters and binder fibers may be suitable for certain purposes, such polyesters have not proven effective for repeatedly withstanding temperatures of up to about 110° C. without losing bond integrity.

SUMMARY OF THE INVENTION

The invention answers the problems connected with previous binder fibers and polyesters by providing polyesters which are formed from the reaction products of at least about 50 mole % of a glycol having either four or six carbon atoms and by controlling the amounts of diethylene glycol and ethylene glycol to less than about 20 mole % of the glycol component. Through the use of the invention, polyester products can be formed which can repeatedly withstand temperatures of up to about 110° C. without losing bond integrity. Further, by controlling the types of catalyst systems employed in the reaction of the dicarboxylic acid and glycol components, copolyesters or copolyester pellets having improved color may be formed.

The invention further answers the problems by providing polyesters having excellent elasticity properties, improved color and dyeing properties, superior thermoplastic flow characteristics and increased bonding versatility. The polyesters of the invention are suitable for use in a wide variety of applications, including molded products, such as those used in the automotive industry and binder fibers for making nonwoven battings and fabrics, textile and industrial yarns, and composites.

More specifically, the invention provides polyesters which are prepared with glycol components and dicarboxylic acid components. Generally, the glycol component contains more than about 50 mole % of a glycol having either four or six carbon atoms and less than about 20 mole % of ethylene glycol or diethylene glycol. Preferably, the glycol component is 1,4-butanediol or 1,6-hexanediol or a mixture thereof. Typically, the dicarboxylic acid component contains at least about 50 mole % of a dicarboxylic acid component which is an acid, anhydride, acid chloride or ester of an aromatic dicarboxylic acid containing from about 8 to about 14 carbon atoms, a cycloaliphatic dicarboxylic acid having about 8 to about 12 carbon atoms or mixtures thereof. Additionally, the dicarboxylic acid component will generally contain about 0 to about 45 mole % of one or more aliphatic dicarboxylic acids containing from about 4 to about 12 carbon atoms.

Generally, the polyesters of the invention have melting points in the range of about 140° to about 185° C. and are semicrystalline or crystalline and may be used to form crystallizable binder fibers. Furthermore, the polyesters of the invention when formed into a bonded structure typically possess elastic bonds which are less susceptible to cracking when subjected to repeated flexing. Thus, preferred fibers of the invention are capable of maintaining the shape and appearance of the bonded product over time. The invention is discussed in more detail below.

DETAILED DESCRIPTION OF THE INVENTION

The invention relates to fibers, particularly binder fibers, made from polyesters, as well as the polyesters themselves. The polyesters of the invention are formed from the reaction of a glycol component and a dicarboxylic acid component. As used in this application, the term polyester is intended to encompass both polyesters formed from one glycol and one dicarboxylic acid and copolyesters which are formed from more than one glycol and/or more than one dicarboxylic acid component.

The polyesters of the invention tend to possess good color and may accept dyes more easily than previous polyesters. Indeed, with the invention, semicrystalline or crystalline polyester polymers may be formed and readily be processed into binder fibers having excellent binding properties. Furthermore, the selection of the glycol component and the dicarboxylic acid component may be controlled to form either crystalline or amorphous polyesters with glass transition temperatures preferably lower than that of polyethylene terephthalate. It is preferred that the polyesters of the invention are formed as semicrystalline or crystalline polyesters. It is most preferred that the polyesters of the invention are semicrystalline or crystalline and have a fairly sharp melting point and melt in the range of about 140 to about 185° C., preferably about 140 to about 175° C. and most preferably about 145 to about 165° C. Through the use of the glycols having four or six carbon atoms, such as 1,4-butanediol or 1,6-hexanediol, it is possible to form the desired semicrystalline or crystalline polyesters and achieve superior control over their melting points. Through the use of the invention polyester products may be formed that may repeatedly withstand elevated temperatures without losing bond integrity and when formed into bonded structures typically possess elastic bonds which are less susceptible to cracking when subjected to repeated flexing. Generally, the semicrystalline or crystalline polyesters of the invention may be either biodegradable or nonbiodegradable. These features and others are discussed in more detail below.

Glycol Component

Generally, the glycol component of the invention contains at least 50 mole % of a glycol having either four or six carbon atoms, alone or in combination with another glycol component. Preferably, the glycol component is 1,4-butanediol or 1,6-hexanediol or a mixture thereof. Additionally, to better control the melting point of the polyesters of the invention, it is preferred that the glycol component contain less than about 20 mole % of ethylene glycol or diethylene glycol.

In a preferred embodiment of the invention, the four or six carbon glycols are aliphatic glycols and are present in an amount ranging from about 60 to about 100 mole %, more preferably about 75 to about 100 mole % and most preferably about 85 to about 100 mole %. Preferably, the glycol component is 1,4-butanediol or 1,6-hexanediol or a mixture thereof.

To better control the melting point of the polyesters of the invention, it is preferred that the glycol component contain less than about 20 mole % of ethylene glycol or diethylene glycol. Furthermore, while the composition may contain a minor amount of ethylene glycol or diethylene glycol, it is more preferred that the amount of these glycols is less than about 10 mole % and most preferably less than about 5 mole % of the glycol component.

In addition to the four or six carbon glycols, the glycol component may also include up to about 20 mole % of conventional glycols including, but not limited to, glycols containing about 3 to about 12 carbon atoms, other than diethylene glycol. Suitable conventional glycols include, but are not limited to, propylene glycol, 1,3-propanediol, 1,5-pentanediol, neopentyl glycol, 2,2,4-trimethyl-1,3-propanediol, 2-ethyl-2-isobutyl- 1,3-propanediol, 2,2,4,4-tetramethyl-1,3-cyclobutanediol, 2,4-dimethyl-2-ethyl-1,3-hexanediol, 2-ethyl-2-isobutyl-1,3-propanediol, 1,3-butanediol, 1,8-octanediol, 2,2,4-trimethyl-1,6-hexanediol, thiodiethanol, and 1,2-cyclohexanedimethanol, 1,3-cyclohexanedimethanol and 1,4-cyclohexanedimethanol. The cyclohexanedimethanol moieties may be present as the cis-, trans- or as a mixture of isomers. Small amounts of polymeric glycols such as poly(tetramethylene glycol) or poly(ethylene glycol) may also be used. In using such polymeric glycols, molecular weights ranging from about 200 to about 5000 are suitable.

Dicarboxylic Acid Component

The dicarboxylic acid component includes acids, functional derivatives of the acids, and mixtures thereof. Non-limiting examples of suitable derivatives include anhydrides, acid halides, esters and mixtures thereof. Typically, the dicarboxylic acid component contains a dicarboxylic acid component which is an acid, anhydride, acid chloride, ester or mixtures thereof, of an aromatic dicarboxylic acid containing from about 8 to about 14 carbon atoms, a cycloaliphatic dicarboxylic acid having about 8 to about 12 carbon atoms or mixtures thereof. Additionally, the dicarboxylic acid component will generally contain about 0 to about 45 mole % of one or more aliphatic dicarboxylic acids containing from about 4 to about 12 carbon atoms.

In a preferred embodiment of the invention, the dicarboxylic acid component contains at least about 50 mole %, more preferably more than about 55 mole % of an acid, anhydride, acid chloride, ester or mixtures thereof, of an aromatic dicarboxylic acid containing from about 8 to about 14 carbon atoms, a cycloaliphatic dicarboxylic acid having about 8 to about 12 carbon atoms or mixtures thereof. Additionally, the dicarboxylic acid component will preferably contain about 0 to about 45 mole %, more preferably about 25–45 mole % of one or more aliphatic dicarboxylic acids containing from about 4 to about 12 carbon atoms. Preferred aliphatic dicarboxylic acids include, but are not limited to, succinic, glutaric, adipic, azelaic, sebacic, suberic and 1,12-dodecanedioc acid. Preferred aromatic and cycloaliphatic dicarboxylic acids include, but are not limited to, terephthalic acid, naphthalenedicarboxylic acid, and 1,3- or 1,4-cyclohexanedicarboxylic acid.

In a preferred embodiment of the invention, the dicarboxylic acid component contains at least one acid, anhydride, acid chloride or ester of an aromatic or cycloaliphatic dicarboxylic acid in combination with at least one aliphatic dicarboxylic acid. When such combinations are employed, it is preferred that the aromatic and/or cycloaliphatic dicarboxylic acids are present in an amount of greater than about 50 mole % and more preferably more than about 55 mole %. Additionally, depending upon its desired melting point, the polyester may be formed from more than about 70 mole % of the aromatic and/or cycloaliphatic dicarboxylic acids. An example of a suitable combination includes about 25 to about 45 mole % of an acid or ester of adipic acid and about 55 to about 75 mole % of an acid or ester of terephthalic acid when 1,4 butanediol is employed as the glycol component.

In a preferred embodiment of the invention, the dicarboxylic acid contains about 55 mole % or more of an acid, ester or anhydride of terephthalic acid, naphthalenedicarboxylic acid, 1,3- or 1,4-cyclohexanedicarboxylic acid or mixtures thereof. In another embodiment of the invention, it is preferred that the dicarboxylic acid component is an ester or acid of terephthalic acid and/or naphthalenedicarboxylic acid alone or in combination with an ester or acid of adipic or glutaric acid.

It should be noted that any of the naphthalenedicarboxylic acid isomers or mixtures of isomers may be used with the 1,4-, 1,5-, 2,6- and 2,7-isomers being preferred with the 2,6-isomer being most preferred. The 1,3- or 1,4-cyclohexanedicarboxylic acid moieties may be as the cis-, trans- or cis/trans mixtures of isomers.

Additionally, other dicarboxylic acids may be employed in the dicarboxylic acid component. The additional dicarboxylic acids, other than those described above, generally contain about 4 to about 40 carbon atoms, for example, an acid or ester of an aromatic, aliphatic or cycloaliphatic dicarboxylic acid. Suitable additional dicarboxylic acids or esters are described in U.S. Pat. Nos. 5,608,031 and 5,668,243, herein incorporated by reference in their entirety. Particularly preferred examples of additional dicarboxylic acid components include, but are not limited to, sulfoisophthalic acid, 1,4-cyclohexanediacetic acid, diphenyl-4,4'-dicarboxylic acid, and dimer acid. The additional dicarboxylic acid components may be added in amounts up to about 20 mole %, more preferably up to about 10 mole % of the dicarboxylic acid component.

Amine Compounds

It is also possible to form the polyesters of the invention in the presence of up to about 20 mole % of an amine compound. Suitable amine containing compounds, include, but are not limited to, aminoalcohols and diamines in an amount of up to about 20 mole % of the glycol component or amine compounds such as aminoacids and lactams in an amount of up to about 20 mole % of the dicarboxylic acid component. The presence of the aminoalcohols, aminoacids, diamines or lactams in the glycol and dicarboxylic acid components provides for the formation of polyesteramides. These polyesteramides possess good binder fiber properties and, in addition, have excellent dyeing characteristics. In particular, deeper dyeing may be achieved through the use of the polyesteramides as compared to unmodified polyethylene terephthlate having the same I.V.

Generally, aminoalcohols for the invention include, but are not limited to, 2-aminoethanol, N,N-diethyl3-amino-1,2propanediol and 4-aminomethylcyclohexanemethanol. Typical diamines include, but are not limited to, ethylenediamine, trimethylenediamine, tetramethylenediamine, pentamethylenediamine, hexamethylenediamine, octamethylenediamine, dodecamethylenediamine and 1,4-cyclohexane-bis-methylamine. Additionally, examples of suitable lactams include, but are not limited to, caprolactam, laurolactam and azacyclododecan-2-one.

Branching Agents

The polyesters of the invention may be linear or branched. By adding a branching agent to the reaction of the glycol component and dicarboxylic acid component, the melt strength of the resulting polyester may be increased. When using a branching agent, small amounts, typically less than about 2 mole %, of conventional branching agents may be reacted with the glycol component and dicarboxylic acid component to form the inventive polyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, pentaerythritol, 3-amino-1,2-propanediol, and 1,3-diamino-2-propanol.

Reaction Process for Forming the Polyesters

In forming the polyesters of the invention, the reaction of the glycol component and the dicarboxylic acid component may be carried out using conventional polyester polymerization conditions. When preparing the polyesters by means of an ester interchange reaction, i.e., from the ester form of the dicarboxylic acid components, the reaction process may comprise two steps. In the first step, the glycol component and the dicarboxylic acid component, such as, for example, dimethyl terephthalate and dimethyl adipate, are reacted at elevated temperatures, typically, about 180° C. to about 280° C. and pressures ranging from about 0.0 to about 60 psig. Preferably, the temperature for the ester interchange reaction ranges from about 190° C. to about 240° C., more preferably about 190° C. to about 230° C. while the preferred pressure ranges from about 15 psig to about 40 psig. Thereafter, the reaction product can be heated under still higher temperatures and under reduced pressure to form polyester with the elimination of glycol, which is readily volatilized under these conditions and removed from the system. This second step, or polycondensation step, may be continued under higher vacuum and at a temperature which generally ranges from about 240° C. to about 290° C. Preferably the temperature ranges from about 245° C. to about 265° C., until a polyester having the desired degree of polymerization, determined by I.V., is obtained. In order to obtain polymers with excellent color, it is desirable to limit the final polycondensation temperature to a maximum of about 260° C. to 265° C. The polycondensation step may be conducted under reduced pressure which ranges from about 400 mm Hg (torr) to about 0.1 mm Hg (torr).

To ensure that the reaction of the glycol component and dicarboxylic acid component by an ester interchange reaction mechanism is driven to completion, it is preferred to employ a stoichiometric excess of glycol component. For example, about 1.2 to about 3 moles and more preferably about 1.8 to about 2.4 moles of glycol component to one mole dicarboxylic acid component are desirable. However, the ratio of glycol component to dicarboxylic acid component is generally determined by the design of the reactor in which the polymerization reaction process occurs.

The polyesters may be prepared by direct esterification, i.e., from the acid form of the dicarboxylic acid component. For example, polyesters may be produced by reacting at least one dicarboxylic acid selected from terephthalic acid, naphthalenedicarboxylic acid, and 1,3- or 1,4-cyclohexanedicarboxylic acid and/or one aliphatic dicarboxylic acid with the glycol components. The direct esterification is conducted at a pressure of from about 1 to about 200 pounds per square inch gauge. To produce a low molecular weight, linear or branched polyester product having an average degree of polymerization of from about 1.4 to about 10, it is preferred to employ a pressure of less than about 100 psig. The temperatures employed during the direct esterification reaction typically range from about 180° C. to about 280° C., more preferably ranging from about 220° C. to about 260° C. This low molecular weight polymer may then be polymerized by a polycondensation reaction.

To ensure that the reaction of the glycol and dicarboxylic acid components by a direct esterification reaction mechanism is driven to completion, it is preferred to employ a stoichiometric excess of glycol component. For example, about 4.0 to 1.01 moles, more preferably 2.0 to 1.1 moles glycol component to one mole dicarboxylic acid component may be used. However, the ratio of glycol component to dicarboxylic acid component will be determined by the design of the reactor in which the reaction process occurs. A high temperature, low pressure step is also needed to complete the polymerization, by removing glycol.

The process of forming the polyesters of the invention may be conducted as a batch, semi-batch or continuous process. Advantageously the process is operated as a continuous process. Indeed, it is possible to produce superior coloration of the polyester when using a continuous process as the polyester may deteriorate in appearance if the polyester is allowed to reside in a reactor at an elevated temperature for too long a duration.

Catalyst System

A variety of catalyst systems are useful in promoting the reaction of the glycol component and the dicarboxylic acid component. Generally, it is preferred to employ a catalyst in the reaction as without the aid of a suitable catalyst, the polymerization reactions do not proceed at a noticeable rate. Typically a catalyst system will contain catalytic materials and catalytic inhibitors.

Catalytic Materials

Catalytic materials which are suitable for the catalyst system include, but are not limited to, materials containing titanium, manganese, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243, and 5,681,918, herein incorporated by reference in their entirety. Generally, the catalyst system used to prepare the polyesters of the invention, comprises materials which contain titanium, manganese and/or zinc and mixtures thereof. While the amounts of the individual catalytic materials in the catalyst system will vary, it is desired that the total amount of catalytic materials in the catalyst system be below about 125 ppm, preferably below about 100 ppm and most preferably below about 80 ppm. The "ppm" for the catalytic materials in the catalyst system and the catalytic inhibitor described below, refers to the weight of the element referred to and is based upon the weight of the final polyester product.

While titanium catalytic materials may be added in the form of complexed materials such as those described in U.S. Pat. No. 5,017,680, the titanium catalytic materials are preferably added in the form of an alkoxide in an amount ranging from about 1 to about 85 ppm as titanium, more preferably about 3 to about 50 and most preferably about 5 to about 35 ppm as titanium. Indeed, copolyesters formed with lower levels of titanium catalytic materials have better stability when held in the melt. Suitable titanium alkoxides include, but are not limited to, acetyl triisopropyl titanate, tetraisopropyl titanate and tetraisobutyl titanate. Particularly preferred titanium catalytic materials include acetyl triisopropyl titanate and tetraisopropyl titanate. The titanium catalytic material may be added to the reaction process prior to direct esterification or ester interchange reaction or prior to the polycondensation reaction.

Manganese catalytic materials are typically added in the form of a salt, such as an organic acid salt in an amount ranging from about 0 to 70 ppm. When employing an ester interchange reaction it is preferred that the manganese is present in an amount of about 20 to about 70 ppm, more preferably about 30 to about 70 ppm and most preferably about 40 to about 70 ppm. Examples of suitable manganese catalyst salts include, but are not limited to, manganous benzoate tetrahydrate, manganese chloride, manganese oxide, manganese acetate, manganese acetylacetonate, and manganese succinate. Manganese is added to the reaction process prior to an ester interchange reaction.

Zinc may be added to the catalyst system in addition to the manganese or in place of the manganese catalyst. Zinc catalytic materials are typically added in the form of a salt in an amount ranging from 0 to 100 ppm, preferably about 25 to about 100 ppm and more preferably about 50 to about 80 ppm. Examples of suitable zinc compounds include, but are not limited to, zinc acetate, zinc succinate, and zinc alkoxide. Zinc is typically added to the reaction process prior to an ester interchange reaction.

If desired, a cobalt catalytic material, may also be employed as part of the catalyst system. When employed, cobalt is typically added in the form of a salt, such as an organic acid salt. Examples of suitable cobalt salts include, but are not limited to, cobaltous acetate trihydrate, cobaltous nitrate, cobaltous chloride, cobalt acetylacetonate, cobalt naphthenate, and cobalt salicylate. Cobalt may be added in an amount of up to about 100 ppm, more preferably up to about 90 ppm. As described below, the cobalt may function as both a catalytic material and as a colorant. As a colorant, cobalt is generally added to the reaction process after a direct esterification or ester interchange reaction. As cobalt is generally used as a colorant, the amount of cobalt is not considered when calculating the total amount of catalytic material.

In some embodiments antimony may be employed, however, it is preferred that the catalyst system not contain antimony. Indeed, in a preferred embodiment of the invention the copolyesters of the invention, and the fibers and binder fibers formed therefrom, do not contain any antimony catalytic materials. When used, however, suitable antimony compounds include, but are not limited to, antimonate esters of inorganic acids, antimony oxide, antimony alkoxides such as antimony isopropoxide, antimony halides, such as antimony chloride, antimony bromide and antimony fluoride, sodium or potassium antimonate, antimony carboxylates, such as antimony acetate and antimony glycolate or mixtures thereof. Preferably the antimony component is an antimony glycolate or an antimony oxide. Antimony is generally added after the ester interchange or a direct esterification reaction but can be added at any part of the reaction. When the copolyester is used to form binder fibers, antimony may be omitted from the catalyst system to avoid deposit buildup on the spinnerette face caused by the presence of an antimony containing catalyst.

While less preferred, calcium, gallium and silicon catalytic materials may be used in the catalyst system. Examples of suitable calcium catalytic materials include, but are not limited to, calcium acetate, calcium glycoxide, and calcium phosphate monohydrate. Examples of suitable gallium catalytic materials include, but are not limited to, gallium chloride, gallium nitrate hydrate, gallium oxide, gallium lactate and gallium phosphide. Examples of suitable silicon catalytic materials include, but are not limited to, silicon acetate and tetraethyl orthosilicate. Germanium catalytic materials include, but are not limited to oxides, organic salts and in particular germanium glycolates.

A preferred ester interchange catalyst system for reacting dicarboxylic acid component esters with glycols contains titanium, manganese, and optionally cobalt, catalytic materials. In the ester interchange catalyst system, the titanium is present in an amount ranging from about 1 to about 85 ppm, preferably about 3 to about 50 ppm, more preferably 5 to 35 ppm, and the manganese is present in an amount ranging from about 30 to about 70 ppm. For direct esterification, a catalyst is not required but is usually added. Titanium catalysts are the preferred catalysts for accelerating the direct esterification. Titanium is also the preferred catalyst for the polycondensation that follows esterification. In this system, the titanium is present in an amount up to about 85 ppm, preferably up to about 50 ppm and more preferably up to about 35 ppm. The titanium can be added any time before polycondensation, but preferably at the beginning of the reaction. Other catalyst systems can also be used but ester exchange catalysts, such as zinc and manganese are not required nor are they desirable when starting with dicarboxylic acids.

Additionally, in another embodiment of the ester interchange or direct esterification catalyst systems, the total amount of catalytic materials in the catalyst system is less than or equal to about 125 ppm, preferably less than about 100 ppm, more preferably less than about 85 ppm and most preferably less than about 70 ppm. A preferred ester catalyst system is typically used in combination with a catalytic inhibitor comprising about 5 to about 90 ppm phosphorus; and a colorant in an effective amount, for example, about 2 to about 10 ppm of a blue and/or red substituted anthraquinone dye. Again, in most cases, the preferred ester interchange catalyst system is substantially free of zinc catalytic materials, more preferably contains less than 5 ppm zinc catalytic materials and most preferably is free of zinc catalytic materials. Additionally, when binder fibers are desired, the preferred ester interchange catalyst system is substantially free of antimony catalytic materials, more preferably contains less than 5 ppm antimony catalytic materials and most preferably is free of antimony catalytic materials.

Catalytic Inhibitor

To stabilize the effects of the catalyst system and to promote efficiency of zinc, manganese and cobalt catalytic materials, it is desirable to add a phosphorus-containing catalytic inhibitor to the reaction process, preferably after an ester interchange or direct esterification reaction but prior to conducting the polycondensation reaction step. Typically, a phosphorus-containing additive is added in the form of an acid or a phosphate, such as phosphoric acid or an organic phosphate ester in an amount ranging up to about 90 ppm and more preferably ranging in amounts up to about 75 ppm. Typically lower amounts of phosphorus inhibitors are employed when using lower amounts of titanium catalysts in the catalyst system. Suitable phosphate esters for use in this invention include, but are not limited to, ethyl acid phosphate, diethyl acid phosphate, trialkyl phosphates such as triethyl phosphate and tris-2-ethylhexyl phosphate as well as arylalkyl phosphates. One useful phosphate catalytic inhibitor is sold under the Merpol® A tradename which is commercially available from Du Pont de Nemours of Wilmington, Del.

Colorants

In forming the polyesters of the invention, colorants, sometimes referred to as toners, may be added to impart a desired neutral hue and/or brightness to the resulting polyester. This helps to offset any naturally occurring yellowness in the polyester. When colored polyesters are desired, pigments, whiteners or colorants may be added to the reaction mixture during the reaction of the glycol component and the dicarboxylic acid component or they may be melt blended with the preformed polyester. A preferred method of including colorants is to copolymerize thermally stable organic colorants having reactive groups such that the colorant is incorporated into the polyester to improve the hue of the polyester. For example, colorants such as dyes possessing reactive hydroxyl and/or carboxyl groups, including, but not limited to, blue and red substituted anthraquinones, may be copolymerized into the polymer chain. Colorants and dyes are described in detail in U.S. Pat. Nos. 4,521,556, 4,740,581, 4,749,772, 4,749,773, 4,749,774, 4,950,732, 5,252,699, 5,384,377, 5,372,864, 5,340,910 and 5,681,918, herein incorporated by reference in their entirety. When dyes are employed as colorants, they may be added to the polyester reaction process after an ester interchange or direct esterification reaction. Furthermore, when a dye or dye mixture is employed as the toner colorant for the polyester, it is preferred that the total amount of dye is less than about 10 ppm. Additionally, in a preferred embodiment of the invention, the colorant is free of cobalt, i.e., the colorant employed produces the desired color in the absence of cobalt.

Alternatively, inorganic pigments, such as titanium dioxide and cobalt containing materials, may be added to the polyester reaction. Advantageously when a catalyst material contains cobalt, the cobalt may also act as a colorant. Care must be taken to control the level of cobalt in order to avoid opacity and dingy appearance in the polyesters of the invention. To control the level of opacity and dinginess, cobalt may be employed in an amount ranging up to about 90 ppm.

Polyesters of the Invention

With the invention, semicrystalline or crystalline polyester polymers may be formed and readily processed into fibers, such as binder fibers having excellent bonding properties. The polyesters of the invention are capable of exhibiting good color and may accept dyes more easily than polyethylene terephthalate polyesters. Furthermore, these copolyesters are more easily dyed at lower temperatures and typically more easily printed.

The polyesters of the invention have an inherent viscosity, I.V., ranging from about 0.4 to about 1.8. Preferably the polyesters of the invention have an I.V. ranging from about 0.5 to about 1.4, and most preferably about 0.6 to about 1.3. The I.V. of the polyesters of the invention is determined by measuring the I.V. at 25° C. using 0.5 g polymer per 100 mL of a solvent consisting of 60% by weight phenol and 40% by weight tetrachloroethane. The basic method of determining the I.V. of a polyester is set forth in ASTM D-2857-95.

The semicrystalline or crystalline polyesters of the invention, with their controlled melting point, are able to bond to objects when activated by conventional means. The preferred polyesters of the invention are capable of resisting failure when the bonded objects are repeatedly subjected to elevated temperatures. For example, headliners and seating components in an automobile formed with the polyesters of the invention preferably do not soften or sag when exposed to elevated summer temperatures which may be as high as 110° C. in a closed car. Additionally, for example, polybutylene terephthalate (PBT) and polyhexylene terephthalate (PHT) melt at 225° C. and 155° C., respectively, and are readily modified with comonomers to provide copolymers having a melting point within the desired range. PET melts at a temperature so high, 255° C., that high concentrations of comonomer are required to lower its melting point to a low range. The high comonomer concentrations for PET, however, tend to cause the formation of amorphous polymers which do not provide suitable bonding when a bonded object is repeatedly subjected to highly elevated temperatures. Also, it has been found that a polyester derived from terephthalic acid and diethylene glycol is very slow to crystallize and has a very low order of crystallinity. Thus, to provide a suitable level of crystallinity and control over the melting temperature of the inventive polyesters, it is desired that the total concentration of ethylene glycol and diethylene glycol is less than about 20 mole % of the glycol component.

Methods for determining the degree of crystallinity are known in the art, for example, differential scanning calorimetry (DSC), density gradient tubes, and x-ray diffraction techniques. Methods for determining crystallinity are discussed in U.S. Pat. No. 5,643,991, herein incorporated by reference in its entirety. Although any method known in the art would be acceptable to determine the degree of crystallinity, the differential scanning calorimetry method is preferred. For DSC analysis, a sample is heated and the temperature is monitored. A crystallization transition and/or crystalline melting transition is observed upon heating a crystalline material. A crystalline polymer will have a well defined crystalline melting peak and temperature. In contrast, an amorphous material will have no crystallization or crystalline melting transition, i.e., no definite melting point. The degree of crystallinity is generally determined by measuring the area under the endotherm peak.

The polyesters of the invention, especially low I.V. polyesters, are capable of bonding activation at lower temperatures and have improved melt flow at lower temperatures than previous polyesters, as measured by the Kayeness instrument, which is similar to the Tinius Olsen Indexer. This improved melt flow may beneficially result in stronger bonds at lower temperatures or shorter exposures and allows for higher manufacturing speeds in the nonwoven bonding activation step. The use of lower bonding temperatures aids in minimizing detrimental effects to higher melting point fibers when they are blended with the polyesters of the invention. For example, the use of lower bonding temperatures aids in the reduction of discoloration, shrinkage, loss of crimp and resiliency, change of tactile aesthetics, less volatilization and smoking of fiber finishes.

Another feature of the polyesters is that when properly activated the polyesters are capable of forming strong bonds with a wide range of polyesters as well as cellulosics (cotton, flax, pulp, cotton linter pulp, fluff pulp and wood fibers, rayons, lyocell, cellulose acetates and other natural and regenerated forms), plus other fibrous and film materials. The polyesters of the invention can be melt spun into fibers, both staple and filament. The polyesters are likewise suitable for use in conventional fabric or web/fabric forming extrusion processes such as spunbonding and melt blowing. As apparent, the elastic behavior of the polyesters offers a wide variety of advantages for a number of applications and can be modified in processing steps such as spinning.

Products Formed from Polyesters of the Invention

The polyesters of the invention may be used to form an article of manufacture or be used as an additive, such as a compounding additive concentrate or master batch for another polymer system. In addition, binder fibers and other articles may be formed with the polyesters that include, but are not limited to, filtration, automotive and structural preforms containing glass, polyester or other fibers, molded parts, sheeting and extruded films and fibers. The inventive polyesters may be part of the articles to be formed or may form the entire article.

Conventional additives may be added to the polyesters of the invention, depending upon the desired end use of the polyester. Suitable additives for the polyesters are described in detail in U.S. Pat. Nos. 5,608,031 and 5,773,554 herein incorporated by reference in their entirety. Typical additives for the polyesters include pigments, antioxidants, stabilizers, flame retardants, delustrants, mold release agents, nucleating agents, tougheners, epoxy compounds, impact modifiers, adhesion promoters, conducting or antistatic agents, wetting agents, liquid repellent agents, antimicrobial agents, free radical stabilizers, other surface modifiers, lubricants, viscosity modifiers, dye promoters and other processing agents.

A preferred article of the invention is a fiber. The fiber may be prepared in any desired length known in the art and generally in the form of a continuous filament or staple fiber. Fibers may be made from the polyesters of the invention through any conventional means available including, but not limited to, melt spinning into fibers or directly into fabrics, the latter including spunbond and melt blown nonwovens. Depending upon the end use, any desired denier may be formed with the fibers employing polyesters of the invention, including fibers having a denier value ranging from microdenier to about 100 denier, preferably up to about 20 denier, most preferably about 1.5 to about 15 denier.

Fibers formed by melt extruding and spinning the inventive polyesters are easier to dye and are deeper dyeing as compared to polyethylene terephthalate homopolymers when employing the same aqueous dyeing conditions. Indeed, dyeing of the inventive polyesters to a deeper depth of shade is possible when employing similar dyeing conditions. Conversely, the same depths of shade can be achieved with lower dyeing costs as compared to the dyeing of polyethylene terephthalate homopolymers. When these fibers are formed into fabrics, they are also more readily printed compared to PET homopolymer fabrics.

Fibers formed from the polyesters of the invention may possess higher elastic properties than polyethylene terephthalate polyester fibers as measured by ASTM D 1774-94. For example, by this test, work recovery, specifically the amount of work recovered from the total amount of work required to extend the fiber to 10% elongation, is 84% for a fiber from Example 1, described below, compared to 41% for polyethylene terephthalate. Because of this distinct property improvement, the fibers of the invention can create highly recoverable, elastic bonds in laminated, molded and other bonded structures. These elastic bonds are less susceptible to cracking when subjected to repeated flexing and can aid in maintaining the shape and appearance of the bonded product over time.

The polyesters may be used to form fibers, such as binder fibers, in any desired configuration known in the art. The polyesters of the invention are preferably in the form of binder fibers having the form, or incorporated into, a fibrous structure. A major advantage of binder fibers is that bonded products containing the binder fibers can be obtained by applying heat, radio frequency techniques, ultrasonic frequencies or dielectric energy to a web or unbonded batting of filaments, with or without pressure. Upon activation, the polyester in the binder fiber softens and flows and upon cooling forms a solid bond with neighboring fibers. The binder fibers of the invention are particularly suited for bonding to polyester, acrylic, nylon, carbon, glass, cellulosic fibers, such as cotton, rayon, lyocell, acetate and pulp-based fibers, flax and scoured wool. Typically, the binder fibers formed with the polyesters of the invention will have deniers of about 1.5 to about 15. However, other fibrous forms such as melt blown webs or spunbonded materials may have microdenier sizes. Separatable, splittable, segmented spun fiber configurations may also have microdenier sizes. Furthermore, the fibers of the invention may be crimped, for example, with sawtooth, stuffer box or helical crimp.

An advantage of the invention is that the fibers of the invention are capable of possessing a deeper dyeability and enhanced printability compared to a fiber grade polyethylene terephthalate homopolymer. Indeed, when tested according to the AATCC Crockmeter Test, the fibers of the invention are capable of achieving the highest ratings for colorfastness. More particularly, the AATCC Crockmeter Test is a method designed to determine the amount of color transferred from the surface of a colored textile material to other surfaces by rubbing. It is applicable to textiles made from all fibers in the form of yarn or fabric whether dyed, printed or otherwise colored. The test procedures in principle involve rubbing a colored test specimen with white crock test cloth under controlled conditions. The color transferred to the white test cloth is assessed by a comparison with the Gray Scale for Staining or the Chromatic Transference Scale and a grade is assigned. When tested for colorfastness to crocking on a scale of 1.0 to 5.0 using the AATCC Crockmeter Test Method 8-1981, the fibers of the invention are capable of achieving superior wet and dry crock ratings of from 4.5 to 5.0.

The binder fibers of the invention may be in the form of unicomponent or bicomponent binder fibers or other multicomponent forms. For example, tricomponent fibers are also a possibility, utilizing a variety of polymers and polymer variants, sometimes with the intermediate layer being a tie-layer to promote interfacial adhesion. The tie-layer can be the polyester of the invention or blends of this polyester with other polymers. Similarly, the polyester of this invention can be used as a tie-layer in laminating and extrusion coating.

Multicomponent binder fibers, such as bicomponent binder fibers may have a sheath/core, side by side, or other configuration known in the art. For example, shaped binder fibers may be formed with the cross-sectional legs capped with binder materials during extrusion. The process of preparing and bonding a low melting point bicomponent binder fiber is described in detail in U.S. Pat. No. 3,589,956, herein incorporated by reference in its entirety. In a bicomponent fiber of the invention, the polyesters of this invention will be present in amounts of about 10 to about 75 weight % of the bicomponent fiber. The other component may be selected from a wide range of other polymeric materials including, but not limited to, polyesters such as polyethylene terephthalate (PET), polytrimethylene terephthalate (PTT), polybutylene terephthalate (PBT), polycyclohexylenedimethylene terephthalate polyesters (PCT), polyethylene naphthalenedicarboxylate (PEN), and polylactic acid based polymers or mixtures thereof. Bicomponent binder fibers may be blended with other fibers or used alone to make nonwoven fabrics and high loft battings having various properties. Generally, bicomponent binder fibers contain a polymer having a high melting point to ensure structural integrity during the bonding process and a lower melting or amorphous polymer to facilitate bonding. Sometimes, economics may dictate that a much less expensive core material be used.

Binder fibers from this invention are readily blended with a wide range of other fibers and subsequently heat or energy activated to provide nonwoven fabrics having good integrity and strength. For example, other fibers in the blends could include, but are not limited to polyester, acrylic, nylon, glass, cellulosic (cotton, pulp-based fibers, cellulose ester fibers etc.) as well as other synthetic and natural fibers. Incorporation in nonwovens can also aid lamination to other fabrics, films and some metallic surfaces. The amount of binder fiber in the nonwoven blend will generally be in the range of about 5 to about 30 weight %, although amounts as little as about 2 weight % can also be used. In some instances fabrics are formed using 100% binder fibers.

Another fibrous structure which may be made with the polyesters of the invention is a fiber which is formed by melt blending less than about 50% of the polyester with a polyolefin or functionalized polyolefin or a polyester other than the polyester of the invention. When melt blending, suitable compatibilizers may be employed for their desired effects. The melt blended polyester/polyolefin may be spun as a fiber to form a fibrous structure. This melt blending allows polyolefins to be spun in a natural state and dyed in separate subsequent operations, something which cannot be satisfactorily achieved with unmodified polypropylene.

The polyesters may also be used as an additive in polyethylene terephthalate (PET), polytrimethylene terephthalate (PTT), polybutylene terephthalate (PBT), polyethylene naphthalenedicarboxylate (PEN), polycyclohexylenedimethylene terephthalate polyesters (PCT) or other polyesters to enhance fiber disperse dye uptake and make it deeper dyeable, thus improving the depth of shading with the same amount of dye under the same conditions employed for dyeing polyesters other than those of the invention, for example a polyethylene terephthalate polymer. This technique can also enhance printability as compared to a fiber grade polyethylene terephthalate homopolymer.

The fibrous structures of the invention are particularly useful for processing into a wide variety of nonwoven, textile and tufted forms which may be activated in many different ways, including dry and wet heat, as well as ultrasonic, dielectric and radio frequency energy. They are also suitable for use in making a wide variety of products including, but not limited to, high loft battings, needlepunched fabrics, flat nonwovens, spunbonds, hydroentangled fabrics, stitch-bonded fabrics, wet-laid nonwovens and paper, woven and knitted fabrics, filter media, face masks, bath mats, scatter rugs, cotton and polyester carpeting, cellulosic insulation, absorbent products, wipes, furniture and auto seating and upholstery, headliners for automobiles, fiber board, particle board, fiberglass composites, fillings for pillows and sleeping bags, cushions, quilts, comforters, coverlets, mattresses, mattress pads, mattress covers, bedspreads, pile fabrics for industrial and apparel uses, blankets, women's robes, interlinings, tiles, carpets, other floor covering materials, outerwear, foot- and handwear, ribbons, decorative yarns and fabrics, multilayer nonwovens, laminates and molded articles. In addition to binder fibers, adhesive powders may be produced from the polyesters of this invention, suitable for the powder bonding of nonwovens and lining fabrics.

Another suitable use for the polyesters of the invention is as a compounding carrier material. For example, the polyester of the invention may be mixed with additives, including colorants, to form a concentrate or masterbatch where the polyester is a carrier material. This concentrate or masterbatch may be combined with another polymer in a later process to provide color, opacity, flame retardancy or other beneficial properties. Polyesters of the invention will accept higher levels of additives, such as pigments, than polyethylene terephthalates of similar inherent viscosities. The polyester may be blended or mixed by any suitable technology known in the art.

The polyesters of the invention may also be blended with a wide range of other polymers as a component of the masterbatch but not the carrier material. Such other polymers include other polyesters, polyamides, cellulose esters, polycarbonates, polyolefins and the like. Such masterbatches may subsequently be blended with more of the same or different polymers to be used in fibers, molded articles, sheeting or films to alter or to enhance properties. Polyesters of the invention will accept high levels of additives, such as pigments. The polyesters may be blended or mixed by any suitable technology known in the art. Additionally, the polyesters of the invention may be in the form of an additive which is a melt blend of the inventive polyesters and a first polymer, wherein the additive when blended with a second polymer, which may be the same or different from the first polymer, is capable of forming a fiber. Thus, any fiber or article which contains, in whole or in part, the polyesters of the invention, is encompassed by this invention.

The following examples are intended to illustrate, but not limit, the scope of the present invention.

EXAMPLES

Example 1

Polyester Containing Adipic Acid

A polybutylene terephthalate (PBT) copolyester containing 42 mole % adipic acid was prepared as follows: A total of 56.32 grams (0.25 moles) of dimethyl terephthalate, 38.06 grams (0.18 moles) of dimethyl adipate, 80.1 grams (0.89 moles) of 1,4-butanediol and 0.5 ml. of a titanium triisopropoxide acetate solution in n-butanol (to provide 83 ppm of Ti) were placed in a 500-ml round bottom flask and attached to a Camile controlled polymer reactor stand. The reaction mixture was stirred and heated by means of a molten metal bath at 190° C. The temperature was maintained at 190–210° C. for 3 hours until all liberated methanol had been distilled from the reaction mixture. The temperature was increased to 260° C. and vacuum was gradually applied to the polycondensation mixture. The temperature was maintained at 260° C. for 2.75 hours and pressure in the flask was 0.1 mm. of Hg for the last 2 hours of the polymerization. The metal bath was removed from the flask and the copolymer in the flask was allowed to cool to room temperature under a nitrogen atmosphere. This polyester sample had an I. V. of 1.18. It had a Tm value of 149° C. and Tg value of −11° C. (determined by DSC analysis). GPC analysis showed it to have a Mn value of 25,922 and Mw value of 78,555. Larger reactor quantities of this polyester were also produced. Similarly, good results were achieved in making this copolyester when using 5 ppm Ti and 55 ppm Mn in the catalyst system. When the copolyester is prepared from terephthalic acid, adipic acid and 1,4-butanediol, good results are achieved when using 10 ppm Ti as the sole catalyst.

Pellets of this polyester were dried at 100° C. for 4 hours and then were melt extruded into multifilament fibers of 7.3 denier/filament (d/f) using a spinnerette having 30 holes (0.35 mm round orifices) at a take-up speed of 950 m/m, a melt temperature of 270° C. and an extrusion rate of 5 pounds per hour. An air flow of 145 cubic feet per minute was used to quench the filaments during extrusion. The as-spun fibers were subsequently drawn in a 70° C. water bath, using a single-stage drafting process to provide a 2:1 draft ratio, followed by a short chamber heated to 140–150° C. These fibers exhibited elastic properties. The fibers were cut into 2 inch staple and had a final denier of 4.0 (d/f).

The as-spun, undrawn form of the above fiber is also an effective binder fiber. For example, a 4 d/f as-spun binder fiber is especially suitable for lightweight nonwovens where low shrinkage is desirable.

PBT copolyesters containing 33 mole % adipic acid moiety (I.V 1.28; Tm 172° C.), or 39 mole % adipic acid moiety (I.V. 1.13; Tm 158° C.) were prepared. These polyesters may be readily spun into fibers at a melt spinning temperature of from about 270° C. to about 275° C.

Example 2

Sheath/Core Bicomponent Fiber

50/50 sheath/core and 40/60 sheath/core bicomponent fibers were made using polyethylene terephthalate homopolymer (IV 0.55) as the core and a PBT copolyester similar to that described in Example 1 (IV 1.12) as the sheath. The bicomponent was formed as follows: Crystallized, dried pellets of PET were melted in an extruder and fed as the core at a melt temperature of 273° C. For the sheath, dried pellets of PBT copolyester were melted in a second extruder and fed to the block at melt temperature of 225° C. The molten streams were coextruded through a spinneret having a sheath/core configuration at metering rates adjusted to produce fibers having a 50% copolyester sheath/50% PET core and 40% copolyester sheath/60% PET core. The fibers were taken up at 1025 m/m. The resultant as-spun fibers were 9 d/f. The fibers were then drafted on rolls using a draw ratio of 2.85:1 to produce 3.2 d/f fibers. The fibers were crimped and cut into 38 mm length staple fibers. In another combination, PBT homopolymer was substituted for PET in the core and was spun at a lower temperature (250° C.).

A similar 50/50 sheath/core bicomponent filament fiber was produced using a PBT copolyester similar to that described in Example 1 (IV 1.12) as the sheath and a 18 MFR (Melt Flow Rate) polypropylene as the core. The 18 MFR polypropylene pellets were melted in an extruder and fed as the core at a melt temperature of 220° C. For the sheath, the PBT copolyester pellets were melted in a second extruder and fed to the block at a melt temperature of 214° C.

These bicomponent binder fibers are useful in making nonwovens, composites and other formed materials when incorporated or combined with polyethylene terephthalate, glass and/or other matrix fibers, fabrics or films. For some nonwoven structures, these binder fibers can also be used in 100% form.

Example 3

Preparation of Nonwoven Web

A 4 d/f unicomponent binder fiber from Example 1 was uniformly blended with PET staple fibers (2¼ d/f) to provide a blend containing 20 weight % binder fiber. The 1¼ oz/yd² intimately blended nonwoven web was formed on a carding line. The binder fibers in the nonwoven web were activated by conveying the web through an infrared oven, followed by hot nipping (175° C.) to bond the fibers in the nonwoven web. Good machine and cross direction tensile strength and drapeability were obtained. Strong bonds were also obtained by passing the web from the card through an air circulating oven, two-minute dwell time at 180° C.

A 7.2 d/f×2-inch 50/50 bicomponent, as-spun binder fiber made similar to that in Example 2 was uniformly blended with PET staple fibers (5.5 d/f) to provide a blend containing 25 weight % binder fiber. The 3 oz/yd² intimately blended web was heated on a dual-plate press at 163° C. to activate bonding. A control nonwoven containing a commercially available PET copolyester (150° C. Tm)/PET core bicomponent binder fiber was also made and bonded under the same conditions. Compared to the control, the nonwoven containing the inventive PBT copolyester sheath bicomponent exhibited equivalent breaking strength, greater toughness and higher elongation.

Binder fibers from the compositions of this invention are also radio frequency activatable. Similarly beneficial results may be achieved when the binder fiber is a PBT copolyester containing 10 mole % isophthalic acid and 25 mole % adipic acid or a PBT copolyester containing 15 mole % 1,4-cyclohexanedimethanol and 18 mole % glutaric acid.

Example 4

Deeper Dyeing Polyester Fiber

A polyester fiber was made from a melt containing 90% (by weight) PET copolyester modified with 3.5 mole % cyclohexanedimethanol (0.76 I.V.) and 10% PBT copolyester modified with 42 mole % adipic acid (1.11 I.V.). The polymers were blended and the fiber was formed as follows: The crystallized PET copolyester pellets were dried 4 hours at 120° C. in a rotary dryer, the temperature was then lowered to 50° C. and the PBT copolyester pellets added, followed by tumble drying 3 hours at 50° C. The dried pellet blend was then fed into an extruder and spun into fibers at a melt temperature of 282° C., using a 49-hole spinnerette (0.35 mm round orifices), an air quench and a take-up speed of 1000 m/m. The 21 denier as-spun filaments were single-stage drafted to 6.5 denier and heat set at 140° C. on rolls under tension. The resultant filaments (0.71 I.V.) exhibited a much faster disperse dye strike and under comparable conditions at 210° F., dyed to deeper shades than the PET controls. The resultant Tg (70° C.) was also lower than the PET controls.

Color fastness to crocking: AATCC Crockmeter Test Method 8-1981 was employed in determining the wet and dry crock ratings. In particular, the dyed fibers were subjected to a rubbing test in which a white cloth is rubbed against the fibers to determine the amount of dye that will rub off the fibers. On a scale of 1 to 5, with 5 being the best, all the dyed fibers of the example exhibited scores in the range of 4.5 to 5.

Example 5

Poly(1,6-hexamethylene terephthalate) (PHT)

Using the general procedure of Example 1, a polyester was prepared from dimethyl terephthalate and 1,6-hexanediol. This polyester had an I.V. of 0.72 and a Tm of 155° C. Dried samples of this polyester were melt spun using the technique described in Example 1 to provide as-spun multifilaments of 12 d/f. These fibers were drafted, crimped and cut to provide staple fibers of 3.5 d/f. These binder fibers were blended with PET fibers to form a blend containing 15 weight % binder fiber. The blend was bonded by passing it through an infrared oven as described in Example 2.

Filament fibers were also readily melt spun from the polyester of this example to provide filaments of 6 d/f. These filaments were readily intermingled or continuously blended with glass filament fibers at a 7% binder fiber level, chopped into staple or roving that was then formed into a composite structure and thermally activated.

Similarly good results may be obtained with PHT copolyesters containing 10 mole % isophthalic acid (I.V. 0.61; Tm 140° C.) or a PHT copolyester containing 10 mole % 1,4-butanediol (I.V. 0.68; Tm 141° C.).

Example 6

Seating Products

A 4 d/f unicomponent binder fiber from Example 1 was uniformly blended with 25 d/f PCT [poly(1,4-cyclohexylenedimethylene terephthalate)]polyester fiber, at 20% binder fiber by weight. A nonwoven batting was produced and layered into a 15"×15" mold under sufficient pressure to obtain a test block density of 2 lbs/ft$^3$. It was then thermally bonded at 180° C. for 30 minutes and cooled prior to removing from the mold. Strong, durable bonds were obtained. The test sample incorporating the elastic properties of the PBT copolyester binder fiber did exhibit very good recovery from compression and resistance to permanent deformation in simulated seating tests. Similarly successful bonded test samples were also produced with PEN [poly(ethylene naphthalenedicarboxylate)]polyester fiber, at 20% binder fiber by weight.

We claim:

1. A fiber comprising a polyester formed from the reaction product of:
    a dicarboxylic acid component and a glycol component;
    wherein the dicarboxylic acid component comprises at least one dicarboxylic acid selected from the group consisting of acids, esters, acid chlorides, anhydrides and mixtures thereof, of an aromatic dicarboxylic acid having from about 8 to about 14 carbon atoms, an aliphatic dicarboxylic acid containing about 4 to about 12 carbon atoms, a cycloaliphatic dicarboxylic acid having about 8 to about 12 carbon atoms or mixtures thereof;
    wherein the glycol component comprises less than about 20 mole % of ethylene glycol or diethylene glycol and more than about 50 mole % of a four carbon glycol, a six carbon glycol or mixtures thereof;
    wherein the dicarboxylic acid component contains up to about 45 mole % of at least one acid, ester, acid chloride or anhydride of the aliphatic dicarboxylic acid;
    wherein the polyester has a melting point in the range of from about 140 to about 185° C.; and
    wherein the polyester is formed in the presence of a catalyst system consisting essentially of a titanium catalyst material or a titanium catalyst material and at least one catalyst material selected from the group consisting of manganese, zinc, cobalt, gallium, calcium, silicon and germanium, and wherein the titanium catalyst material is present in an amount ranging from about 1 to about 35 ppm.

2. The fiber of claim 1, wherein the polyester is semicrystalline or crystalline.

3. The fiber of claim 1, wherein the I.V. of the polyester ranges from about 0.4 to about 1.8.

4. The fiber of claim 1, wherein the acid component comprises at least about 50 mole % of a dicarboxylic acid selected from a group consisting of acids or esters of terephthalic acid, naphthalenedicarboxylic acid, 1,3- or 1,4-cyclohexanedicarboxylic acid or mixtures thereof.

5. The fiber of claim 1, wherein the acid component comprises about 25 to about 45 mole % of an aliphatic acid or ester component or mixtures thereof.

6. The fiber of claim 1, wherein the glycol component is 1,4-butanediol, 1,6-hexanediol or a mixture thereof.

7. The fiber of claim 1, wherein the fiber may be activated by ultrasonic, dielectric, radio frequency techniques and/or by heat.

8. The fiber of claim 1, wherein the fiber has a denier ranging from about 100 to microdenier sizes.

9. The fiber of claim 1, wherein the fiber has a denier ranging from about 20 to about 1.

10. The fiber of claim 1, wherein the fiber is a binder fiber.

11. The fiber of claim 10, wherein the fiber is a unicomponent binder fiber.

12. A fiber formed from the polyester of claim 1, wherein the fiber possesses enhanced printability compared to a fiber grade polyethylene terephthalate homopolymer.

13. A fiber of claim 1, wherein the fiber bonds to polyester, nylon, acrylic, glass, carbon, scoured wool, and cellulosic fibers.

14. A binder fiber comprising a polyester formed from the reaction product of:

an acid component and a glycol component;

wherein the acid component comprises about 25 to about 45 mole % of an acid or ester of adipic acid and about 55 to about 75 mole % of an acid or ester of terephthalic acid;

wherein the glycol component comprises less than about 20 mole % of ethylene glycol or diethylene glycol and more than about 50 mole % of 1,4-butanediol, 1,6-hexanediol or mixtures thereof;

wherein the polyester has a melting point in the range of from about 140 to about 185° C.; and wherein the polyester is formed in the presence of a catalyst system consisting essentially of a titanium catalyst material or a titanium catalyst material and at least one catalyst material selected from the group consisting of manganese, zinc, cobalt, gallium, calcium, silicon and germanium, and wherein the titanium catalyst material is present in an amount ranging from about 1 to about 35 ppm.

15. A semicrystalline or crystalline fiber comprising a polyester formed from the reaction product of:

a dicarboxylic acid component and a glycol component;

wherein the dicarboxylic acid component comprises at least one dicarboxylic acid selected from the group consisting of acids, esters, acid chlorides, anhydrides and mixtures thereof, of an aromatic dicarboxylic acid having from about 8 to about 14 carbon atoms, an aliphatic dicarboxylic acid containing about 4 to about 12 carbon atoms, a cycloaliphatic dicarboxylic acid having about 8 to about 12 carbon atoms or mixtures thereof;

wherein the glycol component comprises less than about 20 mole % of ethylene glycol or diethylene glycol and more than about 50 mole % of a four carbon glycol, a six carbon glycol or mixtures thereof;

wherein the dicarboxylic acid component contains up to about 45 mole % of an acid, ester, acid chloride or anhydride of the aliphatic dicarboxylic acid;

wherein the polyester has a melting point in the range of from about 140 to about 185° C. and an I.V. ranging from 0.4 to 1.8; and wherein the polyester is formed in the presence of a catalyst system consisting essentially of a titanium catalyst material or a titanium catalyst material and at least one catalyst material selected from the group consisting of manganese, zinc, cobalt, gallium, calcium, silicon and germanium, and wherein the titanium catalyst material is present in an amount ranging from about 1 to about 35 ppm.

16. The fiber of claim 15, wherein the glycol component is 1,4-butanediol, 1,6-hexanediol or mixtures thereof.

17. The fiber of claim 15, wherein the I.V. of the polyester ranges from about 0.5 to about 1.4.

18. The fiber of claim 15, wherein the polyester does not contain any antimony catalytic materials.

19. A semicrystalline or crystalline polyester formed from the reaction product of:

a dicarboxylic acid component and a glycol component;

wherein the dicarboxylic acid component comprises at least one dicarboxylic acid selected from the group consisting of acids, esters, acid chlorides, anhydrides and mixtures thereof, of an aromatic dicarboxylic acid having from about 8 to about 14 carbon atoms, an aliphatic dicarboxylic acid containing about 4 to about 12 carbon atoms, a cycloaliphatic dicarboxylic acid having about 8 to about 12 carbon atoms or mixtures thereof;

wherein the glycol component comprises less than about 20 mole % of ethylene glycol or diethylene glycol and more than about 50 mole % of a four carbon glycol, a six carbon glycol or mixtures thereof;

wherein the dicarboxylic acid component contains up to about 45 mole % of an acid, ester, acid chloride or anhydride of the aliphatic dicarboxylic acid;

wherein the polyester has a melting point in the range of from about 140 to about 185° C.; and wherein the polyester is formed in the presence of a catalyst system consisting essentially of a titanium catalyst material or a titanium catalyst material and at least one catalyst material selected from the group consisting of manganese, zinc, cobalt, gallium, calcium, silicon and germanium, and wherein the titanium catalyst material is present in an amount ranging from about 1 to about 35 ppm.

20. The polyester of claim 19, wherein the glycol component is 1,4-butanediol, 1,6-hexanediol or mixtures thereof.

21. The polyester of claim 14, wherein the polyester is free of antimony catalytic materials.

22. The fiber according to claim 1, wherein said catalyst system contains titanium and manganese.

23. The binder fiber according to claim 14, wherein said catalyst system contains titanium and manganese.

24. The semicrystalline or crystalline fiber according to claim 15, wherein said catalyst system contains titanium and manganese.

25. The semicrystalline or crystalline polyester according to claim 19, wherein said catalyst system contains titanium and manganese.

* * * * *

UNITED STATES PATENT AND TRADEMARK OFFICE
CERTIFICATE OF CORRECTION

PATENT NO. : 6,497,950 B1 Page 1 of 1
DATED : December 24, 2002
INVENTOR(S) : Haile et al.

It is certified that error appears in the above-identified patent and that said Letters Patent is hereby corrected as shown below:

<u>Column 20,</u>
Line 43, "14" should be -- 19 --.

Signed and Sealed this

Twenty-seventh Day of May, 2003

JAMES E. ROGAN
*Director of the United States Patent and Trademark Office*